United States Patent
Hon

(10) Patent No.: US 11,845,507 B2
(45) Date of Patent: Dec. 19, 2023

(54) MOTORCYCLE FOOT PEG ASSEMBLY WITH ANGLED TEETH

(71) Applicant: Charlie Hon, Yorba Linda, CA (US)

(72) Inventor: Charlie Hon, Yorba Linda, CA (US)

( * ) Notice: Subject to any disclaimer, the term of this patent is extended or adjusted under 35 U.S.C. 154(b) by 273 days.

(21) Appl. No.: 15/290,535

(22) Filed: Oct. 11, 2016

(65) Prior Publication Data

US 2018/0099716 A1    Apr. 12, 2018

(51) Int. Cl.
*B62J 25/06*        (2020.01)
(52) U.S. Cl.
CPC ..................... *B62J 25/06* (2020.02)
(58) Field of Classification Search
CPC ....................................... B62J 25/00
See application file for complete search history.

(56) References Cited

U.S. PATENT DOCUMENTS

| | | | | |
|---|---|---|---|---|
| 6,663,129 B1* | 12/2003 | Smith | ..................... | B62J 25/00 280/288.4 |
| 7,802,806 B2* | 9/2010 | Danze | ..................... | B62J 25/00 280/163 |
| 7,946,193 B2* | 5/2011 | Smith | ..................... | B62J 25/00 280/291 |
| 8,850,926 B2* | 10/2014 | Bruggemann | ........... | B62J 25/00 74/564 |
| 9,540,066 B1* | 1/2017 | Bloomer | .................. | B62J 25/00 |
| 2007/0057484 A1* | 3/2007 | Gilman | .................... | B62J 25/00 280/291 |
| 2009/0008170 A1* | 1/2009 | Claussen | .................. | B62J 25/00 180/90.6 |

* cited by examiner

*Primary Examiner* — Kevin Hurley
(74) *Attorney, Agent, or Firm* — Steven Rinehart

(57) ABSTRACT

A motorcycle foot peg having forwardly and rearwardly leaning teeth is provided, the teeth for engaging more optimally the soles of footwear worn by a rider when the rider is angling his feet on the leading or trailing edge of the foot peg.

2 Claims, 5 Drawing Sheets

MOTORCYCLE FOOT PEG ASSEMBLY WITH ANGLED TEETH

BACKGROUND OF THE INVENTION

Field of the Invention

This invention relates generally to motorcycles, and more specifically relates to motorcycle foot peg assemblies.

Description of the Related Art

Motorcycle foot pegs are well-known in the art. Typically motorcycles are equipped with foot pegs to support a rider's feet while the motorcycle is in motion. A conventional foot peg is formed as a steel rod or a flat steel platform that projects laterally outwardly from the motorcycle frame in cantilevered fashion. Separate foot pegs are mounted upon each side of the motorcycle and are normally connected to the motorcycle chassis with mounting brackets.

In some embodiments, the foot pegs may fold against the frame of the motorcycle if the motorcycle is laid down during a rider crash. Motorcyclists frequently suffer foot injuries while riding, including from crashes. Riders of dirt bikes can also strike rocks or other passing obstacles which may bend their foot under the foot peg breaking bones and causing severe injury.

In most instances the riders of motorcycles and any passengers sit in an upright position upon a saddle-type seat with their legs astride the motorcycle. Some foot pegs have a plurality of teeth protruding upwards from a top platform of the foot peg for engaging tread on the sole of a rider's boot or footwear. These teeth create traction between the peg and the sole of the rider's shoes most efficiently when the rider's shoes are disposed directly above the teeth perpendicularly.

This is an uncomfortable foot position for many riders. Riders often wish to shift from one position to another either for comfort or out of necessity created by the riding terrain. For instance, a dirt bike rider may favor a retracted riding position in wooded terrain in which the rider's feet are inclined and resting on the trailing or rearward edge of the peg such that obstacles which come in contact with the rider's foot and/or the peg do not force the foot downward in front of the peg. Similarly, in track conditions, riders may favor a forward foot position for racing, jumping, or applying corrective force to the leading edge of the foot peg with a foot angled downward at a decline on the leading edge of the peg.

An inefficiency exists in the art inasmuch as riders desire to change foot positions but lose optimal contact with the upwardly protruding teeth on the pegs when any modified position is assumed. In general, it is an object of the present invention to provide an improved foot peg assembly for a motorcycle with means for engaging a rider's sole optimally in any foot position.

The objects of the invention will become more readily evident from the following detailed description of a preferred embodiment when considered in conjunction with the drawings. A more efficient foot peg is desirable in the art.

SUMMARY OF THE INVENTION

From the foregoing discussion, it should be apparent that a need exists for a foot peg with more efficient engagement means. Beneficially, such an apparatus would include teeth with varied angles of projection.

The present invention has been developed in response to the problems and needs in the art that have not yet been fully solved by currently available apparati and methods. Accordingly, the present invention has been developed to provide a foot peg in combination with a motorcycle, the motorcycle having two or more foot peg mounting brackets, the foot peg comprising: a clevis defining two apertures for receiving a pivot pin, the pivot pin defining a pivot plane; two sidewalls projecting laterally from the clevis, the sidewalls underlying and supporting a top platform; a top platform for engaging the foot of a rider, the top platform supported by two sidewalls, the top platform defining a top plane rotated axially between 10 and 60 degrees forward of the pivot plane; a plurality of rows of teeth protruding orthogonally from the top platform; a leading row of teeth disposed on a leading edge of the peg, the leading row of teeth angled forward to protrude upwards from the top plane at between 20 and 60 degrees, the leading row of teeth adapted to engage the sole of a rider's foot perpendicularly while the rider is in a forward riding position; a trailing row of teeth disposed on a trailing edge of the peg, the trailing row of teeth angled rearward to protrude upwards from the top plane at between 20 and 60 degrees, the trailing row of teeth adapted to engage the sole of a rider's foot perpendicularly while the rider is in a retracted riding position; a trailing a leading row of teeth disposed on a leading edge of the peg, the leading row of teeth angled to protrude upwards from the top plane at between 20 and 60 degrees.

The foot peg may further comprise a U-shaped row of teeth circumscribing an outward edge of the foot peg. The foot peg, in some embodiments, further comprises an X crossmember supporting the top platform.

The foot peg may further comprise two intersecting rows of teeth disposed at regularly-spaced intervals across a top of the X crossmember supporting the top platform.

In some embodiments, the tips of each tooth all fall within a plane parallel to the top plane.

The pivot plane may be rotated 45 degrees behind the top plane and wherein the top plane is orthogonal to a longitudinal plane defined by the motorcycle.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The embodiments of the present invention described herein generally provide for a motorcycle foot peg with teeth angled forward to engage the foot of a rider in a forward riding position and with teeth angled rearward to engage the foot of a rider in a retracted riding position.

Figure 1:
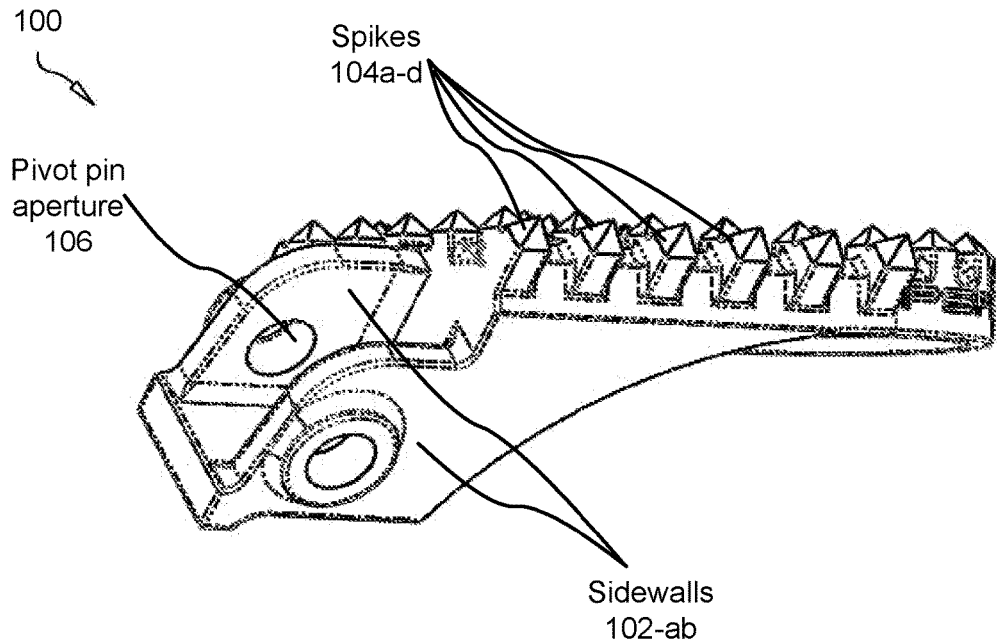
FIG. 1 is rearward perspective view of a motorcycle foot peg in accordance with an embodiment of the present invention.

FIG. 1 is rearward perspective view of a motorcycle foot peg 100 in accordance with an embodiment of the present invention.

The foot peg 100 is adapted to pivot upwards against a contrarily biased spring about the axis of a pivot pin toward a trailing position on a motorcycle.

The foot peg 100 has a top platform which defines a first vertical plane, or top platform plane. The top platform of the foot peg 100 defines a second vertical plane offset by 1 to 60 degrees from the first vertical plane.

The sidewalls underlie and provide support to the top platform of the foot peg 100 and are affixed to, integrated with, or extensions of the clevis disposed on an interior side of the foot peg 100 which detachably engages a mounting bracket on the motorcycle.

The foot peg 100 projects outward from the motorcycles when affixed to the motorcycle and comprises a plurality of upwardly protruding or rising teeth or spikes 104. These spikes 104 may be arranged in rows, columns or patterns, or disposed a regularly-spaced intervals across the top portion of the foot peg 100, or alternatively randomly distributed across the top portion of the foot peg 100.

The spikes 104 in the shown embodiment all project orthogonally upward from the top platform plane except two rows of spikes 104, further described below.

Figure 2:
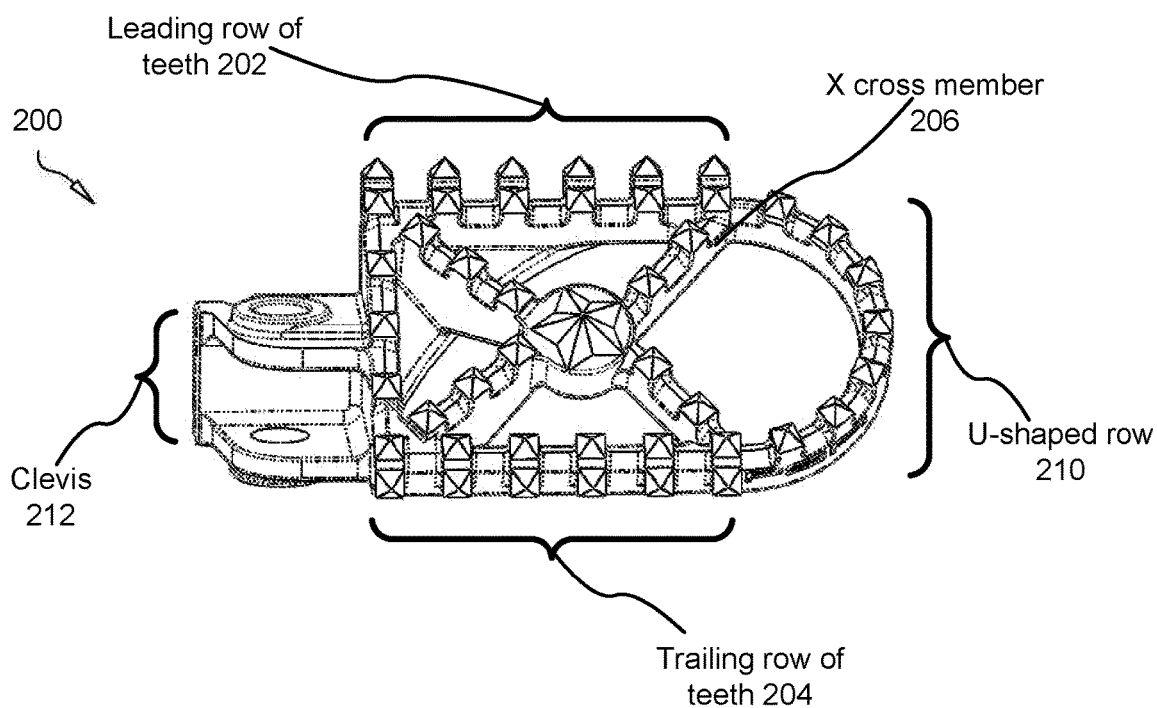
FIG. 2 is an upper perspective view of a motorcycle foot peg in accordance with an embodiment of the present invention.

FIG. 2 is an upper perspective view of a motorcycle foot peg 200 in accordance with an embodiment of the present invention.

The foot peg 200 comprises a leading row of teeth 202 (the terms "teeth" and "spikes" are used synonymously herein) on the forward edge of the peg 200. These teeth 202 jut upwardly and outwardly from the forward edge and are adapted to engage the soles of the footwear of a rider when the rider is in a forward foot position on the motorcycle with the rider's feet resting on the leading edge of the foot peg 200 in a declined position.

In this forward position, the rider's feet optimally engage the leading row of teeth 202 perpendicularly, maximizing traction or engagement between them.

The foot peg 200 also comprises a trailing row of teeth 204 on the rearward edge of the peg 200. These teeth 204 jut upwardly and rearwardly from the trailing edge and are adapted to engage the soles of the footwear of a rider when the rider is in a retracted foot position on the motorcycle with the rider's feet resting on the trailing edge of the foot peg 200 in an inclined position, maximizing optimal engagement between the trailing row of teeth 204 and the feet of the rider.

In other embodiments of the present invention, the foot peg 200 may comprise a plurality of rows 202 of leading teeth and/or a plurality of rows 204 of trailing teeth. The teeth forming the leading row of teeth 202 and the teeth forming the trailing row of teeth 204 may be longer or taller than the teeth disposed across the remaining portion of the top platform such that tips of each tooth all fall in a plane parallel to the top platform plane (or top plane).

The clevis 212 comprises a bracket for engaging a corresponding mounting bracket affixed to the chasis of a motorcycle.

An X crossmember 206 interconnects the sidewalls 102 in the shown embodiments. This X crossmember forms an X shape between the sidewalls and comprises a plurality of upwardly projecting teeth or spikes 104 spaced at regularly intervals. The top surface of the X cross member 206 supports, or helps define or form, the top platform.

Figure 3:
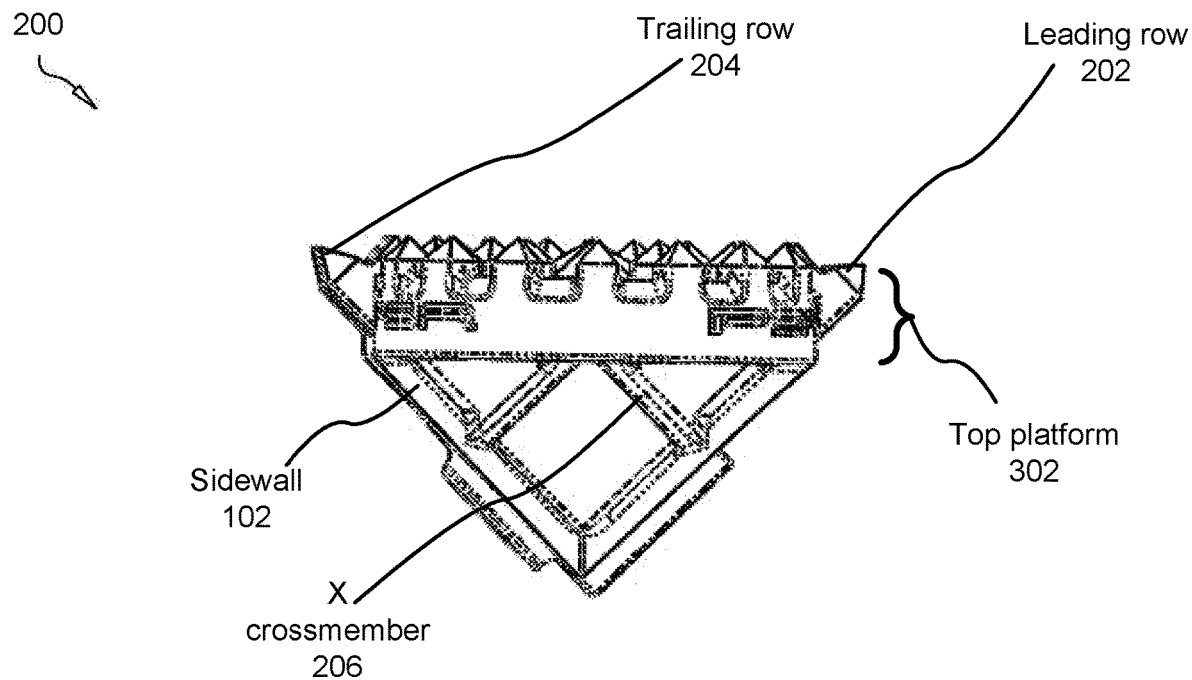
FIG. 3 is an outer-side perspective view of a motorcycle foot peg in accordance with an embodiment of the present invention.

FIG. 3 is an outer-side perspective view of a motorcycle foot peg 300 in accordance with an embodiment of the present invention.

As shown, the trailer row of teeth 204 projects rearwardly behind edge of the top platform 302, while the leading row 202 projects forwardly in front of the leading edge of the top platform 302 (or top portion).

Figure 4:
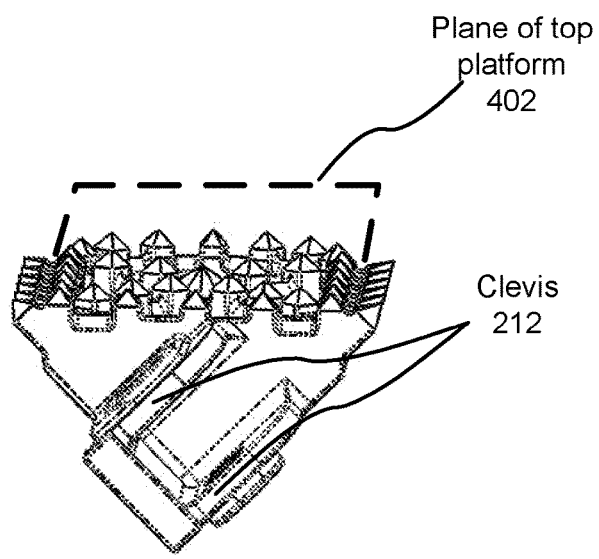
FIG. 4 is an inner-side perspective view of a motorcycle foot peg in accordance with an embodiment of the present invention.

FIG. 4 is an inner-side perspective view of a motorcycle foot peg 400 in accordance with an embodiment of the present invention.

As shown, the clevis fastener 212 is oriented 45 degrees off parallel with the top plane 402. The top plane 402 is shown extending laterally from the top platform 302.

Figure 5:
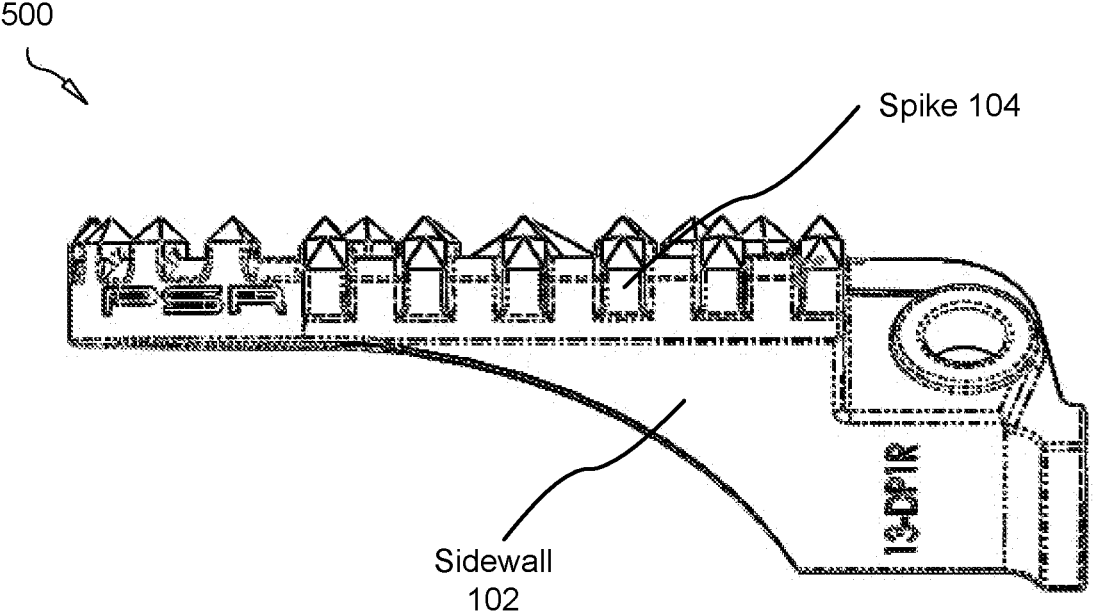
FIG. 5 is a forward perspective view of a motorcycle foot peg in accordance with an embodiment of the present invention.

FIG. 5 is a forward perspective view of a motorcycle foot peg in accordance with an embodiment of the present invention. The spikes 104 vary in length and orientation, with some of the longer spikes jutting forward to engage a declined foot of a rider.

Figure 6:
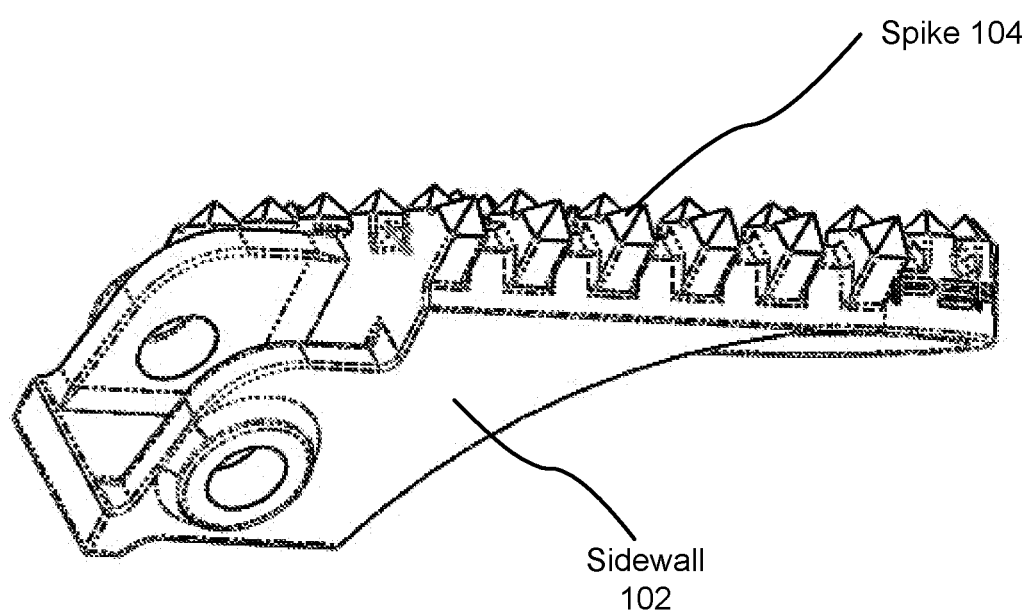
FIG. 6 is rearward perspective view of a motorcycle foot peg in accordance with an embodiment of the present invention.

FIG. 6 is rearward perspective view of a motorcycle foot peg in accordance with an embodiment of the present invention. The spikes 104 vary in length and orientation, with some of the longer spikes jutting forward to engage an inclined foot of a rider.

Figure 7:
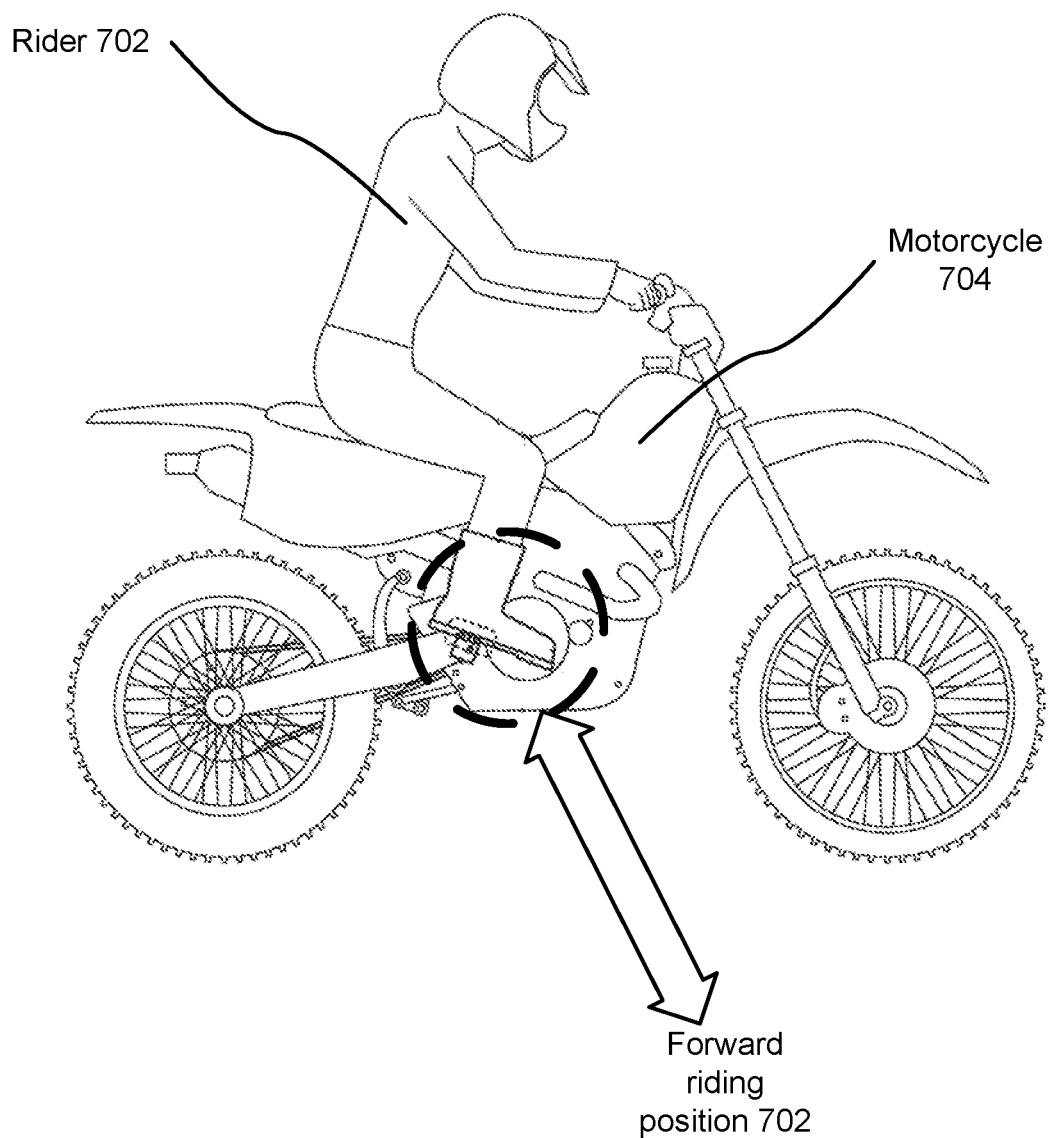
FIG. 7 is side perspective view of a motorcycle having foot peg with a rider in forward foot position in accordance with an embodiment of the present invention.

FIG. 7 is side perspective view of a motorcycle having foot peg with a rider in forward foot position in accordance with an embodiment of the present invention.

In the shown embodiment, the rider 702 is in a forward riding position with his feet declined and resting on the leading edge of the foot peg 100.

Figure 8:
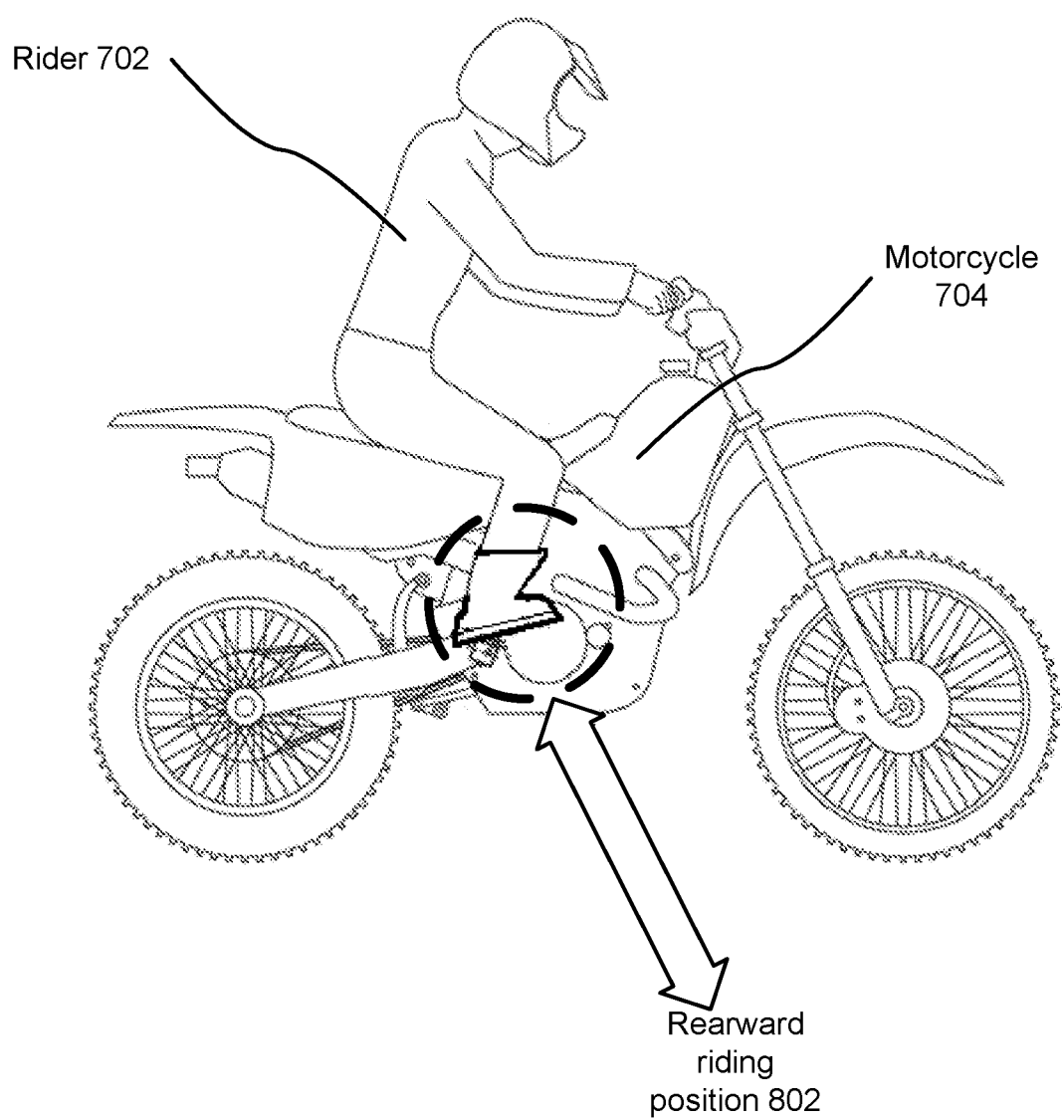
FIG. 8 is side perspective view of a motorcycle having foot peg with a rider in retreated foot position in accordance with an embodiment of the present invention.

FIG. 8 is side perspective view of a motorcycle having foot peg with a rider in retreated foot position in accordance with an embodiment of the present invention.

In the shown embodiment, the rider 702 is in a retracted riding position with his feet inclined and resting on the leading edge of the foot peg 100.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A foot peg in combination with a motorcycle, the motorcycle having two or more foot peg mounting brackets, the foot peg comprising:
    a clevis defining two apertures for receiving a pivot pin, the pivot pin defining a pivot plane;
    two sidewalls projecting laterally from the clevis, the sidewalls underlying and supporting a top platform;
    a top platform for engaging the foot of a rider, the top platform supported by two sidewalls, the top platform defining a top plane rotated axially between 10 and 60 degrees forward of the pivot plane;
    a plurality of rows of teeth protruding orthogonally from the top platform;
    a leading row of teeth disposed on a leading edge of the peg, the leading row of teeth angled forward to protrude upwards from the top plane at between 20 and 60 degrees, the leading row of teeth adapted to engage the sole of a rider's foot perpendicularly while the rider is in a forward riding position;
    a trailing row of teeth disposed on a trailing edge of the peg, the trailing row of teeth angled rearward to protrude upwards from the top plane at between 20 and 60 degrees, the trailing row of teeth adapted to engage the sole of a rider's foot perpendicularly while the rider is in a retracted riding position;
    a leading row of teeth disposed on a leading edge of the peg, the leading row of teeth angled to protrude upwards from the top plane at between 20 and 60 degrees; and
    an X crossmember supporting the top platform.

2. The foot peg of claim 1, further comprising two intersecting rows of teeth disposed at regularly-spaced intervals across a top of the X crossmember supporting the top platform.

* * * * *